United States Patent
Guillot et al.

(10) Patent No.: US 8,907,521 B2
(45) Date of Patent: Dec. 9, 2014

(54) ASSEMBLY OF ACTUATORS AND OF A SYSTEM FOR SUPPLYING ELECTRICAL POWER FROM A NETWORK

(75) Inventors: François Guillot, Paris (FR); Jean-François Weibel, Paris (FR); Roland Casimir, Paris (FR)

(73) Assignee: Sagem Defense Securite, Paris (FR)

( * ) Notice: Subject to any disclaimer, the term of this patent is extended or adjusted under 35 U.S.C. 154(b) by 450 days.

(21) Appl. No.: 13/055,370

(22) PCT Filed: Jul. 21, 2009

(86) PCT No.: PCT/FR2009/000897
§ 371 (c)(1),
(2), (4) Date: Jan. 21, 2011

(87) PCT Pub. No.: WO2010/010251
PCT Pub. Date: Jan. 28, 2010

(65) Prior Publication Data
US 2011/0121651 A1    May 26, 2011

(30) Foreign Application Priority Data
Jul. 23, 2008  (FR) ..................... 08 04182

(51) Int. Cl.
| | |
|---|---|
| H02J 1/00 | (2006.01) |
| H02J 13/00 | (2006.01) |
| B64C 13/50 | (2006.01) |
| B64D 41/00 | (2006.01) |
| H02J 4/00 | (2006.01) |

(52) U.S. Cl.
CPC ............. *H02J 13/002* (2013.01); *B64C 13/50* (2013.01); *B64D 41/00* (2013.01); *H02J 4/00* (2013.01); *Y02T 50/53* (2013.01)

USPC .......................................... 307/31

(58) Field of Classification Search
USPC .......................................... 307/31
See application file for complete search history.

(56) References Cited

U.S. PATENT DOCUMENTS

| | | | |
|---|---|---|---|
| 6,486,568 B1 * | 11/2002 | King et al. ................ | 307/66 |
| 2005/0173198 A1 | 8/2005 | Takehara et al. | |
| 2006/0061213 A1 | 3/2006 | Michalko | |
| 2007/0069070 A1 | 3/2007 | Williams et al. | |
| 2009/0157234 A1 * | 6/2009 | Breit et al. .............. | 701/3 |
| 2009/0235096 A1 * | 9/2009 | Thomas et al. ........... | 713/310 |

FOREIGN PATENT DOCUMENTS

| | | |
|---|---|---|
| DE | 3220782 A1 | 12/1983 |
| EP | 1803644 A2 | 7/2007 |
| WO | WO 01/36230 A2 | 5/2001 |

\* cited by examiner

*Primary Examiner* — Rexford Barnie
*Assistant Examiner* — Daniel Kessie
(74) *Attorney, Agent, or Firm* — Muncy, Geissler, Olds & Lowe, P.C.

(57) ABSTRACT

An assembly having actuators and an electricity power supply system. The assembly includes an input unit connecting the actuators to a three-phase AC electricity network and to a control system. The input unit includes a transformation member arranged to transform the AC into DC at high voltage and connected to a bidirectional power line having connected in series therewith at least one protective switch, a communications interface, and at least one of the actuators. The communications interface is arranged and connected to a central unit to exchange signals over the power line with a signal communications interface of at least one of the actuators. The input unit also includes a charger/discharger unit that connects an energy store to the power line.

7 Claims, 3 Drawing Sheets

ASSEMBLY OF ACTUATORS AND OF A SYSTEM FOR SUPPLYING ELECTRICAL POWER FROM A NETWORK

The present invention relates to an assembly comprising actuators and a system for powering the actuators electrically. By way of example, such an assembly is suitable for use in aircraft in order to actuate flight controls.

BACKGROUND OF THE INVENTION

In an airplane, it is known to use hydraulic actuators connected via a pipework circuit to a hydraulic pump that is connected to the on-board electricity network. The energy consumption of such a pump is relatively high, and the pipework circuit is heavy, bulky, and difficult to install in an airplane.

For several years, the use of electrical actuators has been developed that are connected to the on-board network of the airplane, which network conveys three-phase alternating current (AC). This has made it possible to simplify the structure of airplanes, in particular concerning passing cables, to improve the energy budget, and to simplify maintenance operations.

OBJECT OF THE INVENTION

An object of the invention is to provide means for further simplifying the architecture of an assembly associating actuators with electrical power supply therefor.

SUMMARY OF THE INVENTION

To this end, the invention provides an assembly comprising actuators and an electricity power supply system for powering the actuators from a three-phase AC electricity network, the system comprising an input unit connecting the actuators to the network and to a control system for the actuators, the input unit having a transformation member that is arranged to transform the three-phase AC into direct current (DC) at high voltage and that is connected to a bidirectional power line in which there are connected in series at least one protective switch, a communications interface, and at least one of the actuators, the communications interface being arranged and connected to a central unit that is connected to the control system so as to exchange signals over the power line with a signal communications interface of at least one of the actuators, the input unit also including a charger/discharger unit that connects an energy store to the power line, each actuator including a reversible motor connected to the communications interface to be powered and controlled thereby.

Thus, the power supply line serves both to convey signals providing information about the state of the actuators and power in the form of high voltage DC, thereby making it possible to reduce the number of cables taken to the actuator and to reduce the section thereof, and to reduce the number of signals such as control signals. When an actuator is arranged to move an element, such as a flight control surface, that is itself subjected to an external force tending to return the element to a neutral position, it is possible to recover energy when said element needs to be returned to the neutral position. The reversible motor of the actuator then acts as a generator and the electricity produced is taken to the store. The energy as stored in this way can be used during consumption peaks so that the three-phase electricity network can be dimensioned without needing to be capable of accommodating such consumption peaks, or at least all of such consumption peaks.

In a particular embodiment of the invention, an inverter is connected in series between the protective switch and the communications interface of the input unit to provide the power line with AC for powering the motor of the actuator.

This makes it possible to have an actuator that is relatively simple and to group together the control elements in the input unit which is located in an environment that is subjected to external stresses that are less severe than those to which the actuator is subjected.

In another embodiment, an inverter is connected in series between the communications interface of the actuator and the motor.

The components of the assembly in accordance with this embodiment are then distributed to a greater extent between the actuators and the input unit.

Advantageously, in both embodiments, the input unit includes a plurality of protective switches and of communications interfaces, the power line being subdivided into a plurality of branches, each connected to one of the actuators, each branch having connected in series therewith one of the protective switches and one of the communications interfaces.

In yet another embodiment, a protective switch and an inverter are connected in series between the communications interface and the motor of each actuator, and advantageously, the power line is connected to the actuators to form a bus.

Connecting the actuators to the input unit is then particularly simple and requires little equipment.

Preferably, the charger/discharger unit is arranged to respond to the level of charge in the energy store to control a member for connecting the power line to an energy dissipater load.

The energy dissipation load may be a load that is dedicated to dissipating energy, or it may be an element having some other function but that, in operation, serves to dissipate sufficient energy. When the assembly of the invention is installed on board an airplane, it is possible for example to envisage using deicing resistors as an energy dissipater load.

Other characteristics and advantages of the invention appear on reading the following description of particular, non-limiting embodiments of the invention.

BRIEF DESCRIPTION OF THE DRAWINGS

Reference is made to the accompanying figures in which.

DETAILED DESCRIPTION OF THE INVENTION

Figure 1:
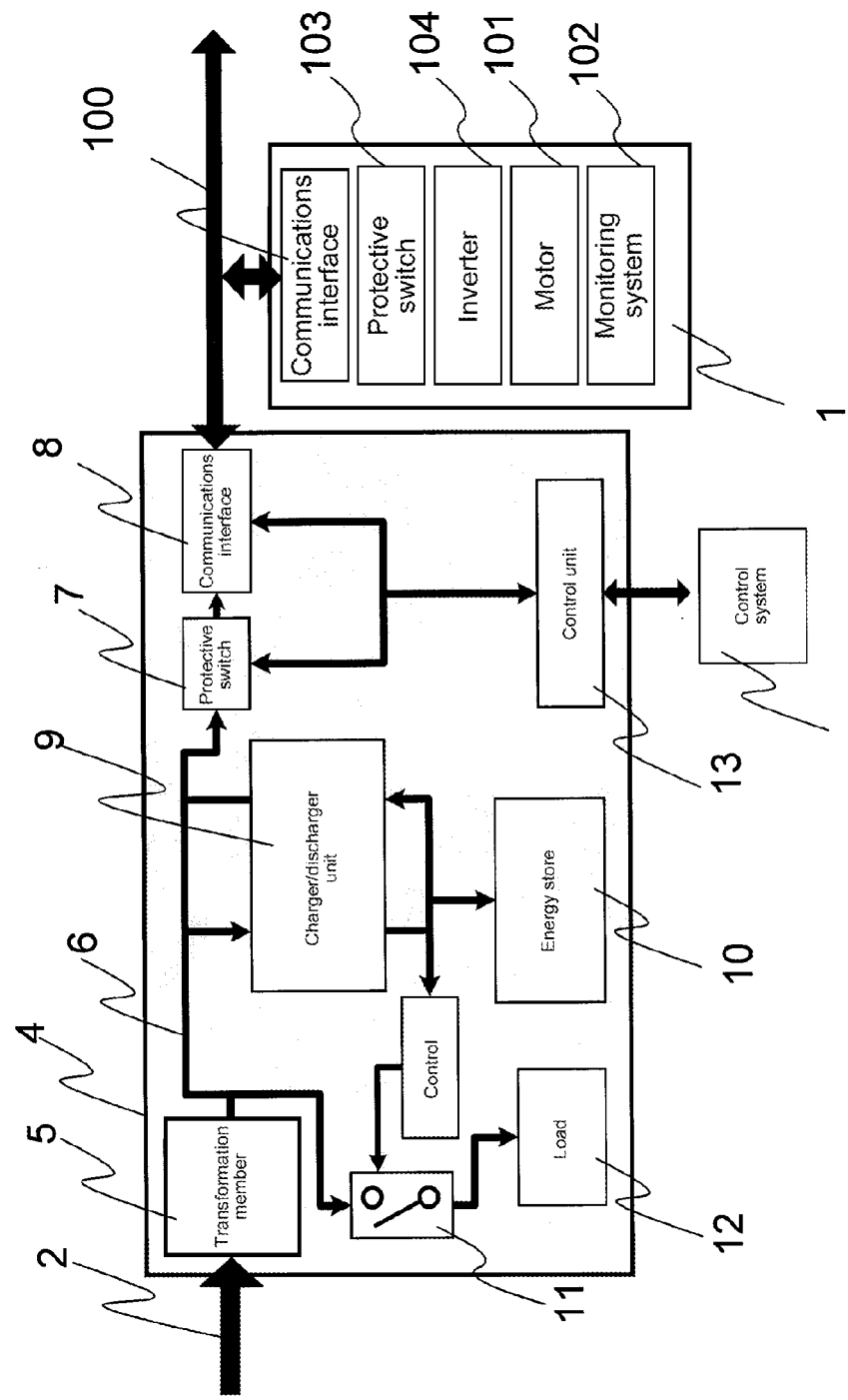
FIG. 1 is a diagram showing an assembly constituting a first embodiment of the invention.

With reference to the figures, the assembly of the invention is for connecting actuators 1 to a power supply network 2 and to a control system 3. The invention is described herein in an aviation application. The actuators 1 are intended to move ailerons, air brakes, flaps, and other control surfaces; the power supply network 2 conveys three-phase AC produced by at least one alternator driven by one of the turbojets of the airplane; the control system 3 is located in an equipment bay of the airplane.

In airplanes, components are generally provided redundantly for safety reasons. Specifically, if the movement of a control surface is driven by two actuators, each of the actuators of that surface belong to two distinct assemblies.

The assembly in accordance with the invention comprises actuators 1 and a system for firing the actuators electrically from the network 2.

Portions that are common to the three embodiments are described initially.

The power supply system comprises an input unit 4 connecting the actuators 1 to the network 2 and to the control system 3.

The input unit 4 includes a transformation member 5 that is arranged to transform the three-phase AC into high voltage direct current (DC), which member is connected to a bidirectional power line 6. The transformation member 5 in this example is of the power factor correcting (PFC) type. The power line 6 is at a potential of 540 volts (V).

The power line 6 has connected in series therewith at least one protective switch 7 and a communications interface 8 connected to a central unit 13 that is connected to the control system 3. The central unit 13 is a computer unit comprising a processor and a memory for executing a program for collecting and exchanging data between the control system 3 and the actuators 1, and a program for monitoring parameters of the electrical power supply, e.g. serving to detect surges and short circuits, etc., so as to control the protective switch 7 accordingly.

The input unit 4 also includes a charger/discharger unit 9 that connects an energy store 10 (such as a battery) to the power line 6 upstream from the protective switch 7. The charger/discharger unit 9 is arranged to respond to a level of charge in the energy store 10 to control a member, here a switch 11, for connecting the power line 6 to a load 12 for dissipating energy. The load 12 may be a load dedicated to dissipating energy, such as simple resistors, or it may be an element having some other function but that in operation also dissipates a sufficient amount of energy, such as deicing resistors of the airplane.

Each actuator 1 includes at least one communications interface 100, a motor 101, and a monitoring system 102. Only one actuator 1 is shown in order to avoid overcrowding the figures.

The communications interfaces 8 and 100 are arranged to exchange signals over the power line 6. The communications interface 8 is arranged to issue control signals from the control system 3 via the central unit 13 destined for the communications interface 100 of each actuator 1. The communications interface 100 is arranged to extract said signals from the power line 6 and to use them for controlling the motor 101. The communications interface 100 is also arranged to issue information signals (state of the motor, position of the moved control surface, temperature, . . . ) coming from the monitoring module 102 and for delivery to the communications interface 8. The communications interface 8 is arranged to extract the signals from the power line 6 and to forward them to the central unit 13 which relays them to the control system 3. The power line 6 thus serves simultaneously to convey the electricity that powers the power circuit of the actuators 1 and to convey signals between the communications interfaces.

By way of example, the actuators 1 are controlled to move each control surface between a neutral position and an extended position. When the control surface is in its neutral position, it extends parallel to the airstream generated by the movement of the airplane, whereas in its extended position the control surface is subjected to pressure from the air. Each actuator 1 is therefore powered to move the control surface from its neutral position to its extended position and to hold the control surface in its extended position against pressure from the air. In order to bring the control surface from its extended position to its neutral position, the power supply to the motor 101 is switched off and the pressure of the air returns the control surface to its neutral position. The motor 101 then acts as a generator and produces electricity that is returned to the energy store 10 via the power line 6 and the charger/discharger unit 9. If the maximum level of charge is reached in the energy store 10, then the switch 11 is controlled to deliver the electricity that is produced to the load 12. In a variant, the electricity that is produced may be delivered to the network 2. When controlling the actuators 1 gives rise to a consumption peak, electricity is taken not only from the network 2 but also from the energy store 10 via the charger/discharger unit 9.

The power line 6 is bidirectional, i.e. it enables power and signals to travel in both directions.

With reference to FIG. 1, and in a first embodiment, the input unit 4 has only one protective switch 7 and only one communications interface 8 mounted in a single branch of the power line 6. All of the actuators 1 are connected to this branch, which forms a bus for transmitting power to the actuators 1 and a communications bus between the actuators 1 and the input unit 4.

Each actuator 1 includes a protective switch 103 and an inverter 104 that are connected in series between the communications interface 100 and the motor 101.

Figure 2:
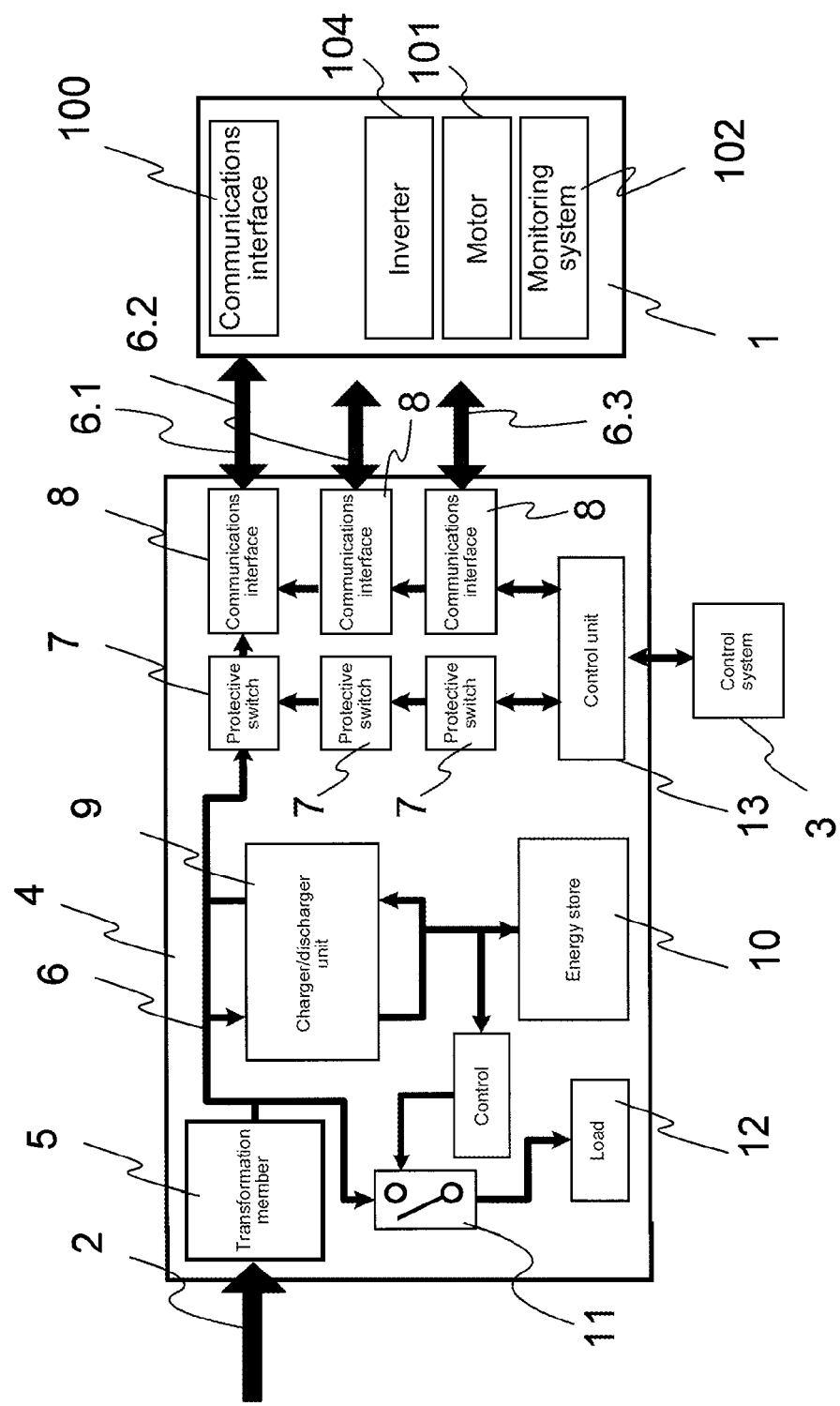
FIGS. 2 and 3 are diagrams analogous to FIG. 1 for two other embodiments.

With reference to FIG. 2, and in a second embodiment, the input unit 4 has a plurality of protective switches 7 and of communications interfaces 8.

The power line 6 is subdivided into as many branches 6.*i* as there are actuators 1 in the assembly (where i varies from 1 up to the number of actuators) such that each branch 6.*i* is connected to one of the actuators 1.

Each branch 6.*i* has connected in series therewith one of the protective switches 7 and one of the communications interfaces 8.

Each actuator 1 includes an inverter 104 connected in series between the communications interface 100 and the motor 101.

Figure 3:
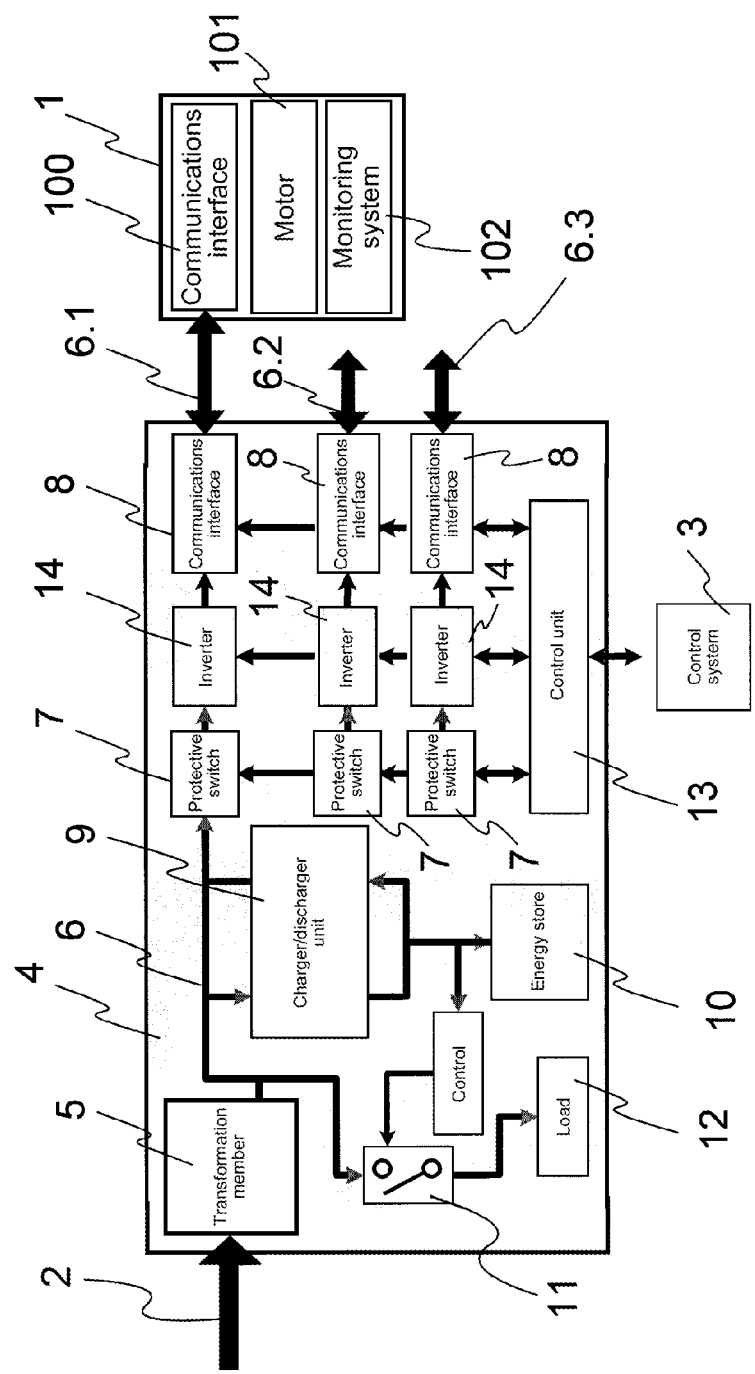

With reference to FIG. 3, and in a third embodiment, the input unit 4 has a plurality of protective switches 7 and of communications interfaces 8.

The power line 6 is subdivided into as many branches 6.*i* as there are actuators 1 in the assembly (i varying from 1 up to the number of actuators) such that each branch 6.*i* is connected to one of the actuators 1.

Each branch 6.*i* has connected in series therewith one of the protective switches 7, an inverter 14, and one of the communications interfaces 8. The inverter 14 is arranged to deliver AC to the branch 6.*i* in which it is connected for powering the motor 101 of the actuator 1 connected to said branch 6.*i*.

Naturally, the invention is not limited to the embodiments described but covers any variant coming within the ambit of the invention as defined by the claims.

In particular, the embodiments described may be combined with one another.

The invention claimed is:

1. An assembly, comprising:
   at least one actuator;
   an electricity power supply system for powering the at least one actuator from a three-phase alternating current (AC) electricity network, the electricity power supply system, comprising:
   an input unit connecting the at least one actuator to the network and to a control system for the actuator, the input unit having a transformation member that is arranged to transform the three-phase AC electricity into direct current (DC) at high voltage and that is connected to a bidirectional power line in which there are connected in series at least one protective switch; and a communications interface, the communications interface being arranged and connected to a central unit that is connected to the control system;

wherein the power line both conveys the electricity from the electricity power supply system to the at least one actuator and conveys signals between the communication interface of the electricity power supply system and at least one communication interface of the at least one actuator;

wherein the input unit also includes a charger/discharger unit that connects an energy store to the power line;

wherein the at least one actuator includes a reversible motor connected to the communications interface to be powered and controlled thereby, wherein an inverter is connected in series between the protective switch and the communications interface of the input unit to provide the power line with AC for powering the motor of the at least one actuator, wherein the input unit includes a plurality of protective switches, a plurality of inverters, and a plurality of communications interfaces, the power line being subdivided into a plurality of branches, each branch respectively connected to one of the actuators, each branch having connected in series therewith one of the protective switches, one of the inverters, and one of the communications interfaces, and all protective switches, all inverters and all communication interfaces are connected to the central unit.

2. The assembly according to claim 1, wherein the power line is connected to the at least one actuator to form a bus.

3. The assembly according to claim 1, wherein the charger/discharger unit is arranged to respond to the level of charge in the energy store to control a member for connecting the power line to an energy dissipater load.

4. The assembly according to claim 3, wherein at least one deicing resistor is used as the energy dissipater load.

5. The assembly according to claim 1, wherein the transformation member is of the power factor correcting (PFC) type.

6. The assembly according to claim 1, wherein the power supply line is at a potential of 540 volts.

7. The assembly according to claim 1, wherein the at least one communication interface of the electricity power supply system is connected in series on the power line.

* * * * *